July 29, 1941.    S. FLEISCHMAN    2,250,477
COUPLING
Filed June 19, 1940
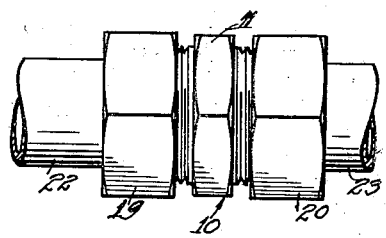
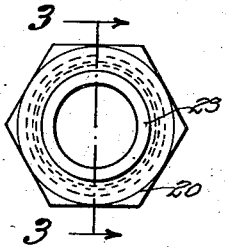
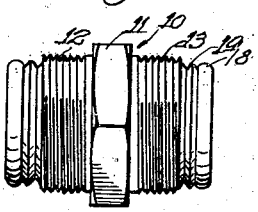
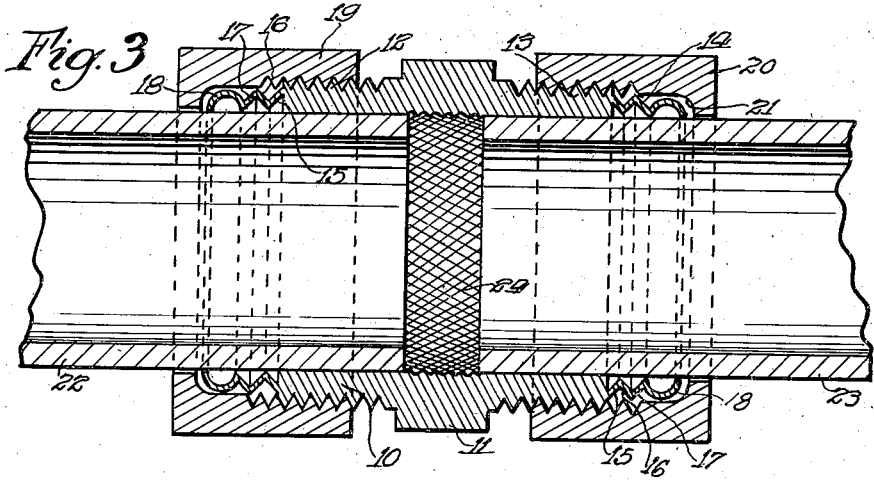
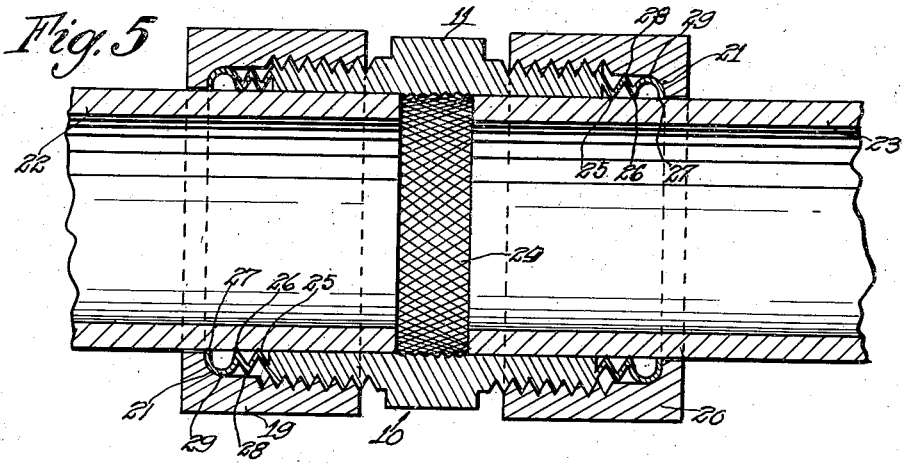
Inventor
Samuel Fleischman
by Henry Hech
Attorney Patented July 29, 1941

2,250,477

UNITED STATES PATENT OFFICE 2,250,477

COUPLING

Samuel Fleischman, Chicago, Ill., assignor of twenty per cent to Henry Blech, Chicago, Ill.

Application June 19, 1940, Serial No. 341,248

4 Claims. (Cl. 285—193)

The invention relates to couplings, and more particularly, to pipe couplings adapted to connect the smooth unthreaded ends of pipes or conduits.

It is an object of the invention to provide a pipe coupling which comprises a tubular member in which nuts are applied which, in functional position, establish a hermetic seal between the tubular member and the pipe ends.

A further object constitutes the provision of sealing means integral with the tubular member and rendered active by the application of the nuts.

Another object constitutes the provision of a hermetically sealing coupling which comprises three parts only, the tubular member and the two nuts applied to its ends.

A still further object constitutes the provision of certain features of construction and arrangement of parts tending to enhance the utility and efficiency of pipe couplings.

With these and other objects in view, which will become more apparent from a perusal of the invention, the latter comprises the means described in the following specification, particularly pointed out in the claims forming a part thereof and illustrated in the accompanying drawing, in which Fig. 1 is an elevational view of a coupling constructed in accordance with my invention, Fig. 2 is an end view, Fig. 3 is an enlarged section on the line 3—3 of Fig. 2, Fig. 4 is an elevational view of the tubular coupling member, and Fig. 5 is a view similar to Fig. 3, with the sealing means in effective condition.

Referring to the several views in the drawing, the improved coupling comprises a tubular member 10 which, at the center, is enlarged and formed with an integral nut 11 to be engaged by a wrench.

The tubular member adjacent to the central nut is provided with external threads 12 and 13. Each end of the tubular member is provided with a thin web-like extension 14 which is tubular but has accordion pleat construction whereby slanting walls 15, 16 and 17 are formed. The terminal portion 18 of the extension is semi-circular.

The outer diameter of the extension is less than the outer diameter of the threads 12 and 13 so that sufficient clearance obtains for the application of nuts 19 and 20, to the tubular member 10.

Each nut 19 and 20 is provided with a rounded seat 21 on the same radius as the semi-circular portion 18.

At the center, the tubular member on the inside is provided with a knurled surface 24 to limit the extent to which the ends of pipes 22 and 23 may be inserted into the coupling member.

In Fig. 3 the nuts 19, 20 are shown threaded onto the coupling member 10 but short of the final position thereon.

In the continued application of the nuts, the seat 21 of the nuts 19, 20 engages the semi-circular portion 18 and begins to compress the extension 21 whereby the edges of the accordion pleats are forced into tight or biting engagement with the inner surface of the nut and the outer surface of the pipe.

As shown in Fig. 3, after the nuts are screwed home, the pipe is gripped at three spaced points or lines 25, 26 and 27, constituting effective seals. Likewise, effective seals are formed at the inner wall surface of the nut at 28 and 29.

It is evident that the coupling is of extremely inexpensive construction, yet highly effective, to provide a hermetic seal. The coupling having but three parts, namely the tubular member and the nuts, may be applied with dispatch and minimum effort of labor and cost.

The extensions 14 by reason of their construction are flexible and resilient so that, after compression by tightening the nuts 19 and 20 and subsequent unscrewing of the nuts, the extensions resume their original form as shown in Fig. 3.

While the drawing shows one embodiment of the invention, changes and alterations may be made without departing from the spirit of the invention.

I, therefore, do not limit myself to the details of construction and arrangement of parts, as shown, by way of example, but claim my invention as broadly as the state of the art permits.

I claim:

1. A pipe coupling including a tubular member receiving the end of a pipe and provided with external threads, a shouldered nut adapted to be screwed onto said member, and means including a wave like extension integral with said member, and adapted to be engaged by the shoulder of said nut for distorting said extension radially thereby sealing the interspace between said pipe and said nut at a plurality of spaced points.

2. A pipe coupling including a tubular member receiving the end of a pipe and provided with external threads, a shouldered nut adapted to be screwed onto said member, and resilient means including a wave like extension integral with said member, and adapted to be engaged by the shoulder of said nut for distorting said extension radially thereby sealing the interspace between said pipe and said nut at a plurality of spaced points.

3. A pipe coupling including a tubular member receiving the end of a pipe and provided with external threads, a shouldered nut adapted to be screwed onto said member, and an accordion pleated portion of reduced thickness forming an integral extension with the end of the tubular member and adapted to be distorted radially upon engagement by the shoulder of said nut thereby sealing the interspace between said pipe and said nut at a plurality of spaced points.

4. A pipe coupling comprising a tubular member having external threads and receiving the end of a pipe, a member forming a sleeve in contact with the pipe, a shouldered nut adapted to be screwed onto said member, and means including a wave like extension of reduced thickness adapted to be distorted radially upon engagement with the shoulder of said nut thereby sealing the interspace between said pipe and said nut at a plurality of spaced points, said wave like extension originating at the outer surface of said tubular member.

SAMUEL FLEISCHMAN.